United States Patent
Wideman

(10) Patent No.: US 7,817,369 B2
(45) Date of Patent: Oct. 19, 2010

(54) IMPLEMENTING POWER SAVINGS IN AN AUTOMATED STORAGE SYSTEM

(75) Inventor: Roderick B. Wideman, Shakopee, MN (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 12/366,406

(22) Filed: Feb. 5, 2009

(65) Prior Publication Data

US 2010/0195242 A1 Aug. 5, 2010

(51) Int. Cl.
G11B 19/02 (2006.01)
G06F 1/32 (2006.01)

(52) U.S. Cl. ........................................ 360/69; 713/320
(58) Field of Classification Search ........................ None
See application file for complete search history.

(56) References Cited

U.S. PATENT DOCUMENTS 6,725,385 B1 * 4/2004 Chu et al. .................. 713/320
2009/0207520 A1 * 8/2009 Golasky et al. ............... 360/69
2009/0254645 A1 * 10/2009 Haustein et al. ............. 709/223

* cited by examiner

Primary Examiner—Andrew L Sniezek
(74) Attorney, Agent, or Firm—Roeder & Broder LLP; James P. Broder

(57) ABSTRACT

In a method of implementing power savings in an automated storage system, a power savings mode authorization is sent from a library controller to a tape drive, such that the tape drive is authorized to enter an extended power savings mode that maintains an operational host interface in the tape drive for communicating with a host system. A media move command is received at a tape library of the automated storage system. The media move command comprises a command from the host system for the tape library to move a tape cartridge to the tape drive. In response to receiving the media move command, an instruction is issued to the tape drive to transition from the extended power savings mode to an active power mode. The instruction is issued prior to notifying the host system of completion of the media move command.

19 Claims, 6 Drawing Sheets

500

SEND A POWER SAVINGS MODE AUTHORIZATION FROM A LIBRARY CONTROLLER TO A TAPE DRIVE SUCH THAT THE TAPE DRIVE IS AUTHORIZED TO ENTER AN EXTENDED POWER SAVINGS MODE WHICH MAINTAINS AN OPERATIONAL HOST INTERFACE IN THE TAPE DRIVE FOR COMMUNICATING WITH A HOST SYSTEM.
510

RECEIVE A MEDIA MOVE COMMAND AT A TAPE LIBRARY OF THE AUTOMATED STORAGE SYSTEM, WHEREIN THE MEDIA MOVE COMMAND COMPRISES A COMMAND FROM THE HOST SYSTEM FOR THE TAPE LIBRARY TO MOVE A TAPE CARTRIDGE TO THE TAPE DRIVE.
520

RESPONSIVE TO RECEIPT OF THE MEDIA MOVE COMMAND, ISSUE AN INSTRUCTION TO THE TAPE DRIVE TO TRANSITION FROM THE EXTENDED POWER SAVINGS MODE TO AN ACTIVE POWER MODE, WHEREIN THE INSTRUCTION IS ISSUED PRIOR TO NOTIFYING THE HOST SYSTEM OF COMPLETION OF THE MEDIA MOVE COMMAND.
530

TRANSITION THE TAPE DRIVE TO AN ACTIVE POWER MODE IN PARALLEL WITH THE MOVE OF THE TAPE CARTRIDGE TO THE TAPE DRIVE.
540

500

---

SEND A POWER SAVINGS MODE AUTHORIZATION FROM A LIBRARY CONTROLLER TO A TAPE DRIVE SUCH THAT THE TAPE DRIVE IS AUTHORIZED TO ENTER AN EXTENDED POWER SAVINGS MODE WHICH MAINTAINS AN OPERATIONAL HOST INTERFACE IN THE TAPE DRIVE FOR COMMUNICATING WITH A HOST SYSTEM.
510

↓

RECEIVE A MEDIA MOVE COMMAND AT A TAPE LIBRARY OF THE AUTOMATED STORAGE SYSTEM, WHEREIN THE MEDIA MOVE COMMAND COMPRISES A COMMAND FROM THE HOST SYSTEM FOR THE TAPE LIBRARY TO MOVE A TAPE CARTRIDGE TO THE TAPE DRIVE.
520

↓

RESPONSIVE TO RECEIPT OF THE MEDIA MOVE COMMAND, ISSUE AN INSTRUCTION TO THE TAPE DRIVE TO TRANSITION FROM THE EXTENDED POWER SAVINGS MODE TO AN ACTIVE POWER MODE, WHEREIN THE INSTRUCTION IS ISSUED PRIOR TO NOTIFYING THE HOST SYSTEM OF COMPLETION OF THE MEDIA MOVE COMMAND.
530

↓

TRANSITION THE TAPE DRIVE TO AN ACTIVE POWER MODE IN PARALLEL WITH THE MOVE OF THE TAPE CARTRIDGE TO THE TAPE DRIVE.
540

```
AT A TAPE DRIVE IN AN AUTOMATED STORAGE SYSTEM,
RECEIVE A POWER SAVINGS MODE AUTHORIZATION FROM A
LIBRARY CONTROLLER OF THE AUTOMATED STORAGE SYSTEM.
610
```

```
IMPLEMENT AN EXTENDED POWER SAVINGS MODE WITHIN THE
TAPE DRIVE IN RESPONSE TO RECEIPT OF THE AUTHORIZATION.
620
```

```
TRANSITION THE TAPE DRIVE FROM THE EXTENDED
POWER SAVINGS MODE TO AN ACTIVE POWER MODE IN
PARALLEL WITH AN AUTOMATED PHYSICAL MOVE OF A
TAPE CARTRIDGE TO THE TAPE DRIVE.
630
```

```
AUTOMATICALLY TRANSITION THE TAPE DRIVE FROM THE
EXTENDED POWER SAVINGS MODE TO AN ACTIVE POWER
MODE IN RESPONSE TO AN INSERTION OF A TAPE
CARTRIDGE INTO THE TAPE DRIVE.
640
```

FIG. 6

IMPLEMENTING POWER SAVINGS IN AN AUTOMATED STORAGE SYSTEM

BACKGROUND

Generally speaking, data storage solutions are under increasing pressure on many fronts including capacity, density, performance, and power efficiency. With respect to power efficiency, interest in conserving power within data centers, and automated storage systems used therein, has generated increased awareness for 'green' solutions that use less power. Moreover, as data storage customers plan their data storage solutions, they often keep an eye on the total cost of ownership of the storage solution rather than simply on the initial acquisition cost. Customers' concerns about power consumed by their storage systems and by cooling systems needed to cool the storage systems are increasingly relevant to their buying decisions. This is because the cost of power for operation and cooling is a large factor in the total cost of ownership of a data center or automated storage system.

Tape-based storage solutions have demonstrated significant power savings when compared to disk-based solutions. This is largely because idle tape drives inherently use less power than idle disk drives, which continue to expend power to spin their disks. Despite this lower comparative power consumption of tape-based storage solutions, there is still a desire, due to environmental and economic reasons, to further reduce power consumption.

BRIEF DESCRIPTION OF THE DRAWINGS

The accompanying drawings, which are incorporated in and form a part of this specification, illustrate some embodiments of the subject matter and, together with the description, serve to explain principles discussed below:

FIG. 5 illustrates a flow diagram of an example method of implementing power savings in an automated storage system, according to an embodiment.

FIG. 6 illustrates a flow diagram of an example method of implementing power savings in a tape drive of an automated storage system, according to an embodiment.

Figure 1:
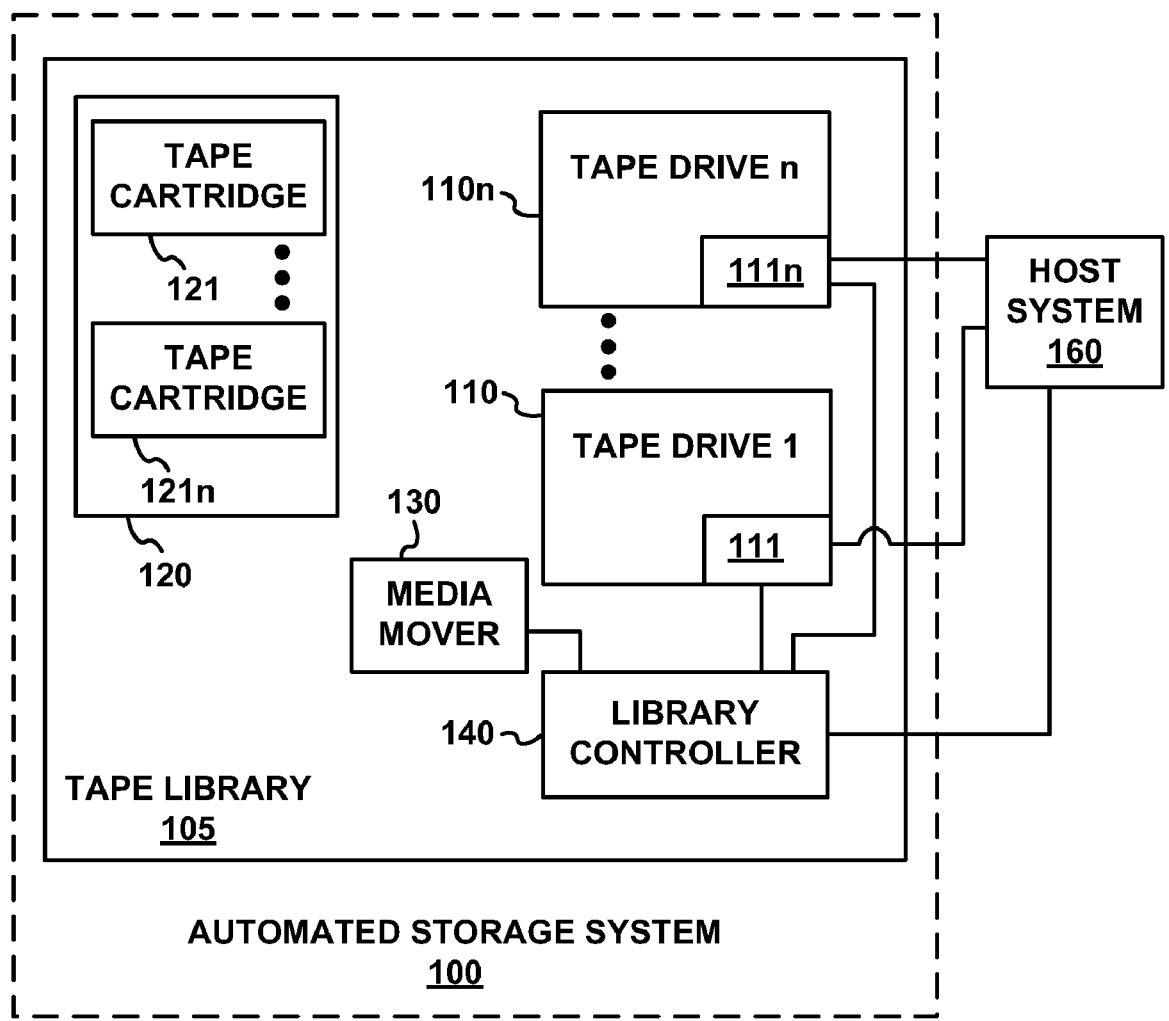
FIG. 1 is a block diagram of an example automated storage system, according to an embodiment.

The drawings referred to in this brief description should be understood as not being drawn to scale unless specifically noted.

DESCRIPTION OF EMBODIMENTS

Reference will now be made in detail to various embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments of the invention are intended to cover alternatives, modifications and equivalents, which may be included within the spirit and scope of the various embodiments of the invention as defined by the appended claims. Furthermore, in the following description of embodiments, numerous specific details are set forth in order to provide a thorough understanding of embodiments of the subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the description of embodiments, discussions utilizing terms such as "sending," "receiving," "issuing," "transitioning," "verifying," "implementing," "initiating," "attaining," "indicating," "keeping," "authorizing," "instructing," "monitoring," "coordinating," or the like, refer to the actions and processes of a computer system, microcontroller, processor, or similar electronic computing device. The computer system, microcontroller, processor, or similar electronic computing device manipulates and transforms data represented as physical (electronic) quantities within the computer system's/microcontroller's/processor's/similar electronic computing device's registers and memories into other data similarly represented as physical quantities within the memories or registers. In some embodiments the computer system, microcontroller, processor, or similar electronic computing device is included within, coupled with, or takes the form of a tape drive, a library controller, a tape library, and/or an automated storage system.

Overview of Discussion

An automated storage system can comprise one or more tape libraries, one or more virtual tape libraries, and/or a combination of one or more tape libraries/virtual tape libraries and other storage such as disk based storage. Some approaches to reducing power use in automated storage systems include powering down unused or idle resources, such as redundant robotics and controllers. With respect to tape libraries, one of the primary sources of power consumption is the tape drive/drives. Newer generations of tape drives, such as the LTO-5 (Linear Tape Open-5) drive will likely have self-directed reduced power modes that are managed wholly within the tape drive itself While these self-directed reduced power modes are helpful, the tape drive still needs to maintain sufficient power for certain aspects of the drive (e.g., respond to commands, maintain tape path mechanics, etc.). Additional savings could be obtained if the tape drive were allowed to further remove or reduce power to some of these aspects under certain conditions such as when no media is loaded.

One approach to this might be for a tape library to simply remove power from a tape drive when no media is loaded, and then power it back on when media is to be mounted. While this approach might conserve the maximum amount of power, it has been found that it has the shortcoming of not allowing the tape drive to maintain minimal communication with a host application server. This lack of communication, in turn, often results in the host system 'downing' the drive (i.e., marking the drive as failed and not present and available for use). This shortcoming might be overcome through use of a bridge (e.g., an input/output blade or server) that could 'spoof' the response of a tape drive and act as a proxy for it during the time it is powered off However, this extra layer adds additional hardware cost and complexity to a solution, and consumes power as well.

Instead, as described herein, a solution that does not require extra physical overhead is to authorize a tape drive to enter an extended power savings mode when it is in an inactive state or when it next enters an inactive state. The extended power savings mode utilizes less power than an idle power mode or a self-directed reduced power mode of the tape drive, but yet remains sufficiently responsive to hosts to preserve 'presence' of the tape drive. In one embodiment, in conjunction with this authorization, the tape drive is then provided with an adequate advance notice to provide sufficient time to return to a full power active power mode condition with little or no delay to overall operation of a tape library or automated storage system. That is to say, the tape drive is instructed to power back up from the extended power savings mode to an active power mode when a host initiates a media move command that will involve moving media such as a tape cartridge to mount (insert) in the tape drive. The tape drive then powers back up, or substantially powers back up, in parallel with the process of physically moving the media, thus resulting in little or no delay, due to power up time, to the tape drive reading or writing data.

Discussion will begin with a description of an example automated storage system (including an example tape library) with which, or upon which, embodiments described herein may operate. Discussion will proceed to a description of an example tape drive with an extended power savings mode that can be authorized for implementation externally from the tape drive. Discussion will then turn to description of an example library controller that can operate to authorize implementation of an extended power savings mode within a tape drive and can also operate to authorize the tape drive to return to an active power mode. Operation of the automated storage system, tape library, library controller, tape drive and their components will then be described in more detail in conjunction with descriptions of an example method of implementing power savings in an automated storage system and an example method of implementing power savings in a tape drive of an automated storage system.

Example Automated Storage System

FIG. 1 is a block diagram of an example automated storage system 100 according to an embodiment. Automated storage system 100 includes one or more tape libraries 105. In one embodiment, tape library 105 comprises an actual tape library with physical components. In another embodiment, tape library 105 is implemented as a virtual tape library and exists as logical components along with disk based storage. The concept of a virtual tape library (VTL) is well known. The DX series of VTLs produced by Quantum® Corporation provides an example of a VTL. In one embodiment, automated storage system 100 comprises one or more tape libraries 105 (or VTLs) and/or other storage devices such as a disk storage device or storage system (not shown). For clarity herein, examples and descriptions refer to physical components of tape libraries and tape drives. However, it is appreciated that, in most cases, the descriptions herein are equally applicable to use with virtual tape libraries and automated storage systems that employ virtual tape libraries.

It is appreciated that automated storage system 100 can, in one embodiment, comprise only a tape library and no other storage devices. In such an embodiment, as illustrated in FIG. 1, tape library 105 and automated storage system 100 are one and the same. As shown in FIG. 1, tape library 105 comprises a tape drive 110 (or plurality of tape drives 110-110n), a plurality of storage slots 120, a media mover 130, and a library controller 140.

In operation, tape library 105 is coupled with a host system 160, such as a server or computer system, which reads data from and stores data to tape library 105. Host system 160 sends a command that indicates its desire to read from or write data to automated storage system 100. Typically, host system 160 will issue a 'move media' command to tape library 105, and will issue 'read' or 'write' commands to the tape drive separately. A media move instruction directs tape library 105 to mount (insert) a particular tape cartridge 121 into a particular tape drive 110 so that host system 160 can read data from or write data to that tape cartridge.

Storage slots 120 comprise slots for storing a plurality of tape cartridges 121-121n. Each storage slot of the plurality of storage slots 120 comprises a cell or slot for storing a tape cartridge 121.

Media mover 130 comprises an automated media moving mechanism such as a robot, autoloader, picker, or the like, which is used for moving a tape cartridge 121 from a storage slot of storage slots 120 to a particular tape drive 110. Typically this move operation takes tens of seconds to several minutes to physically accomplish in a tape library. Consider an embodiment of a tape library 105 that comprises several hundred storage slots 120. In such an embodiment, for purposes of discussion and not limitation, it can be assumed that the act of moving a tape from storage slots 120 and inserting it into drive 110 takes on average 20 seconds. It is appreciated that host system 160 is aware that a media move takes some non-trivial amount of time and thus allocates a loading time delay between sending a move media command and requesting a read or write activity and actually attempting to read or write to a tape drive in which media is being loaded. In practice, this loading time delay is also allocated by host systems to virtual tape libraries, even though no media is being physically moved.

Consider an embodiment, where the average media move time is 20 seconds, but the loading time delay allocated by host system 160 is about 300 seconds (five minutes). As can be seen this allocated loading time delay is typically much longer than the average load time. Based upon the time consumed in an average media move as compared to the time allocated for a media move, it is evident that a host system 160 is typically very patient with respect to waiting for media to be moved and mounted. On the other hand, a host system 160 is typically not patient when communicating with a tape drive 110, as it expects a response nearly immediately from such communications, whether they are status check type communications or read/write communications. Thus, when host system 160 is notified of completion of a media move to mount media into tape drive 110, it expects to be able to read data from and write data to tape drive 110.

Tape drive 110 is communicatively coupled with tape library controller 140 and with host system 160. In one embodiment, tape drive 110 is a tape drive such as an LTO-5 compliant tape drive, which operates to read data from a tape cartridge 121 and/or write data to a tape cartridge 121. In one embodiment, tape drive 110 comprises a host interface 111 that it utilizes to communicate with host system 160, such as for reading from and/or writing to a tape cartridge 121, which has been inserted into (mounted in) tape drive 110. In one embodiment, communications between host system 160 and library controller 140 are tunneled through host interface 111 or some other portion of tape drive 110. As illustrated by host interfaces 111-111n in FIG. 1, in one embodiment, when multiple tape drives 110 are utilized in a tape library 105, all or a plurality of the tape drives 110-110n include a host interface 111-111n.

In one embodiment, tape drive 110 includes an extended power savings mode in which a host interface remains active but many or all other systems and/or components within tape drive 110 are powered down and/or placed in a mode that substantially reduces the overall power consumption of tape drive 110. The concept of an extended power savings mode is discussed further in conjunction with FIG. 4. In brief, however, the extended power savings mode is a mode that uses less power than an idle power mode and less power than a self-directed reduced power mode (if such mode exists) of tape drive 110. Tape drive 110 is discussed in greater detail in conjunction with FIG. 2.

Example Tape Drive

Figure 2:
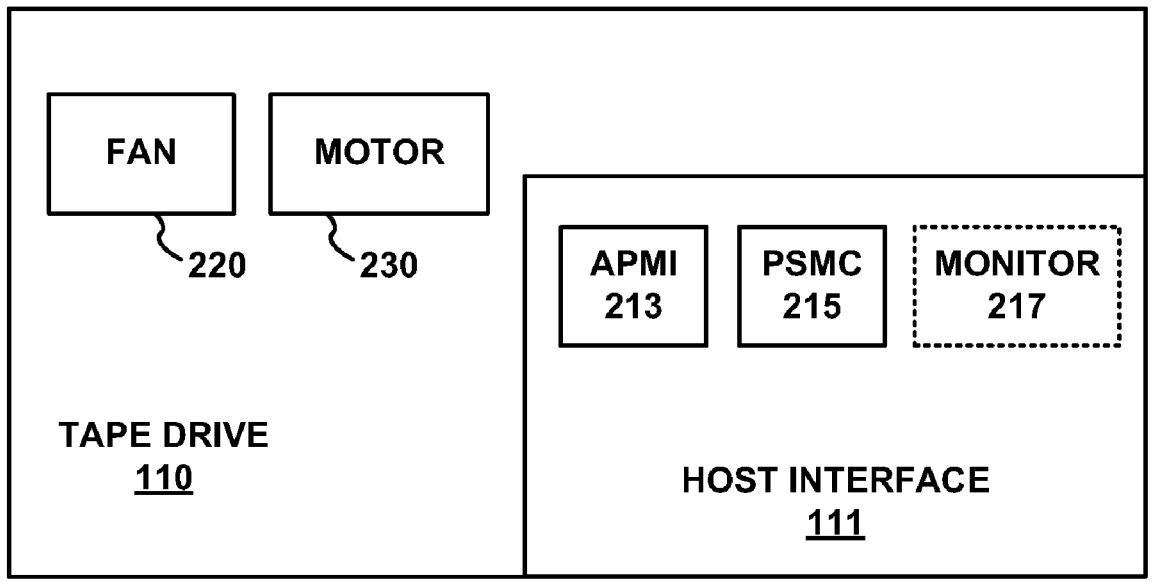
FIG. 2 is a block diagram of an example tape drive, according to an embodiment.

FIG. 2 shows a block diagram of an example tape drive 110, according to an embodiment. Tape drive 110 comprises numerous components such as a fan 220 for cooling, one or more motors 230 for spooling tape, and other electronics/electro-mechanics such as for tensioning tape and performing calibrations. Host interface 111 can be implemented, in various embodiments, as hardware or a combination of hardware and one or more of firmware, and computer-executable instructions. In one embodiment, host interface 111 comprises an application specific integrated circuit or a processor that performs one or more of the functions described herein. As shown in FIG. 2, host interface 111 includes an active power mode indicator 213 and a power savings mode coordinator 215. In one embodiment, where communications to library controller 140 are tunneled through tape drive 110, host interface 111 also includes a monitor 217.

Power savings mode coordinator 215 operates to coordinate a transition of tape drive 110 into an extended power savings mode and/or to an active power mode from an extended power savings mode. The coordination of a transition to extended power savings mode involves power savings mode coordinator 215 receiving a power savings mode authorization, such as from library controller 140. Once this authorization is received, power savings mode coordinator 215 coordinates shutting down or substantially reducing power to components such as fan 220 motors 230 and/or other electronic and electromechanical components within tape drive 110. This can comprise some components being powered down to a point where they may or will require some sort of calibration or testing when they are powered back up for active use.

The extended power savings mode results in a lower power draw than when tape drive 110 is standing by for use in an idle power mode with all components active, but not necessarily being used. In some embodiments, tape drive 110 may have a self-directed reduced power mode that it can implement, such as when it is inactive for a particular period of time. The extended power savings mode also results in a lower power draw than when tape drive 110 is in a reduced power mode. This is because the reduced power mode must leave some components active enough that drive 110 can power up to an active power mode when a tape cartridge 121 is inserted. However, as will be further described, in various embodiments after tape drive 110 has been authorized to enter an extended power savings mode, tape drive 110 is alerted to the impending insertion of a tape cartridge 121, mounting of media is delayed until tape drive 110 achieves an active power mode, and/or notification of completion of a media move to tape drive 110 is delayed so that the time for powering up to an active power mode is attributed to media movement rather than to an unresponsive tape drive.

The coordination of transition to active power mode from extended power savings mode involves power savings mode coordinator 215 receiving an instruction to implement the active power mode. In one embodiment, this transition instruction can be received from outside of tape drive 110, such as from library controller 140. In another embodiment, this transition instruction can be received in the form of a tape cartridge being inserted into tape drive 110. In another embodiment, this transition instruction can be generated internally, such as by monitor 217 in response to monitoring for and finding a media move command that will involve moving media to mount in tape drive 110. Once the transition instruction is received, power savings mode coordinator 215 coordinates bringing components of tape drive 110 back up to an active power state in which tape drive 110 can read from and write to inserted media under control of host system 160. As some components may have been completely powered off, powering back up to an active power mode can comprise calibration or testing of some components. In one embodiment, this process takes tens of seconds and can be accomplished within the time that it takes for completion of a media move. In another embodiment, this process may take slightly longer than the time required for a media move. To compensate for this, mounting of media can be delayed until an active power mode is achieved or else reporting of media move completion can be delayed until after an active power mode is achieved. It is appreciated that because at least minimal communications are maintained while in an extended power savings mode, transitioning to an active power state from an extended power savings mode is typically faster than powering up a tape drive from a complete shutdown.

Active power mode indicator 213 indicates attainment of an active power mode by tape drive 110. In one embodiment, this can comprise setting an externally accessible bit in a register to indicate that tape drive 110 has attained or is in an active power mode and is thus prepared to receive insertion of a tape cartridge and immediately respond to read/write requests from host system 160. In one embodiment, this can additionally or alternatively comprise sending a signal, such as to library controller 140, that indicates that tape drive 110 has attained or is in an active power mode and is thus prepared to receive insertion of a tape cartridge and/or is ready to immediately respond to read/write requests from host system 160.

Monitor 217, when included, operates to monitors communications tunneled from host system 160 to library controller 140 via tape drive 110. In particular, in one embodiment, monitor 217 monitors for any communication that is indicative of host system 160 directing a media move involving tape drive 110. In one embodiment, when monitor 217 finds such a communication an instruction is provided to power savings mode coordinator 215 to bring tape drive 110 to an active power mode state. This instruction may slightly precede library controller 140 directing media mover 130 to move a tape cartridge 121 to tape drive 110, but generally results in tape drive 110 beginning to power up in parallel with the physical movement of tape cartridge 121 to tape drive 110. In this manner, tape drive 110 can be powered up or substantially powered up to an active power mode before media mover 130 is ready to insert tape cartridge 121 into tape drive 110. In one embodiment, when the power up is complete, active power mode indicator 213 indicates that the active power mode has been achieved, and in response, library controller 140 authorizes media mover 130 to then insert tape cartridge 121 and complete the media move.

Example Library Controller

Figure 3:
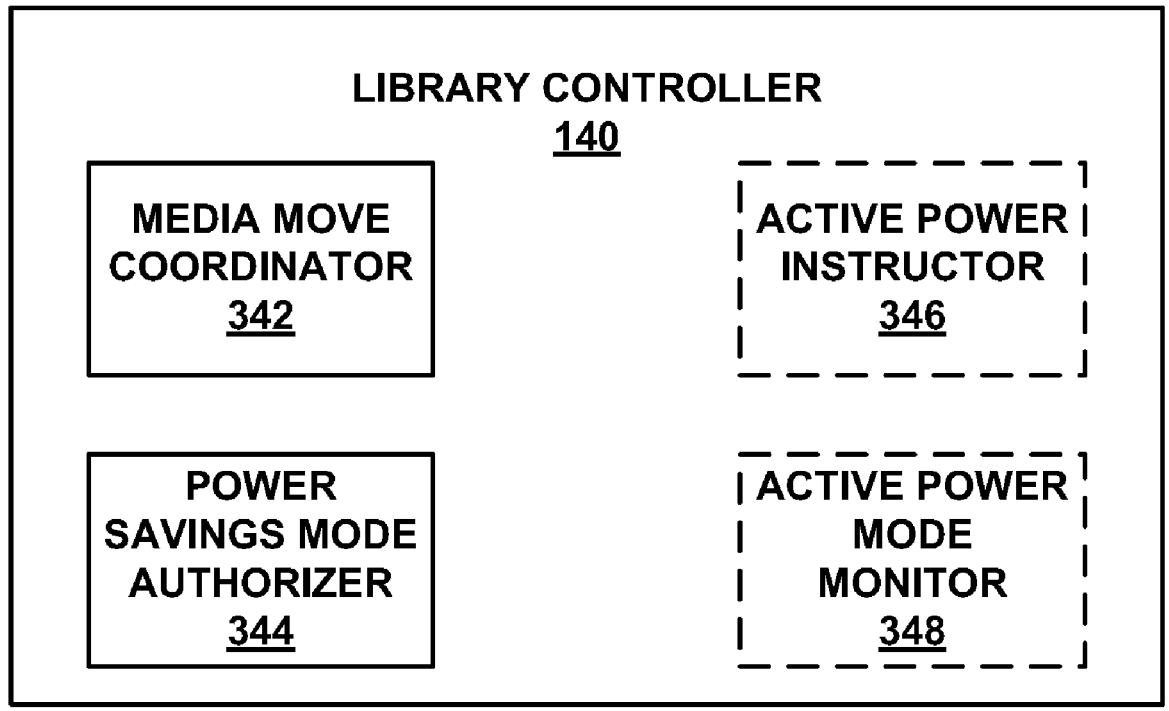
FIG. 3 is a block diagram of an example library controller, according to an embodiment.

FIG. 3 is a block diagram of an example library controller 140, according to an embodiment. Library controller 140 can be implemented, in various embodiments, as hardware or a combination of hardware and one or more of firmware, and computer-executable instructions. In one embodiment, library controller 140 comprises an application specific integrated circuit or a processor that performs one or more of the functions described herein. As shown in FIG. 3, in one embodiment, library controller 140 comprises a media move coordinator 342 and a power savings mode authorizer 344. In one embodiment, library controller 140 also comprises one or more of an active power instructor 346 and an active power mode monitor 348.

In response to library controller 140 receiving a media move command from host system 160, media move coordinator 342 communicates with media mover 130 to affect the move of media that has been commanded by host system 160. Media move coordinator 342 provides a media move command and/or other media move instructions to media mover 130. In one embodiment, media move coordinator 342 also coordinates the mounting of media, such as to delay the mounting of media until a tape drive 110 in which the media is being mounted has achieved an active power mode. In one embodiment, after media has been mounted as commanded by host system 160, media move coordinator 342 indicates or else signals completion of the media move to host system 160. In some embodiments, media move coordinator 342 delays indication/signaling of completion of the media move until a tape drive 110, in which the media was being mounted, has achieved an active power mode if the active power mode was not achieved prior to mounting of the media. This allows time for achieving the active power mode to be counted in the delay time that host system 160 allows for physical moving and mounting of media, rather than allowing tape drive 110 to be non-responsive to read/write requests from host system 160.

Power savings mode authorizer 344 authorizes a tape drive, such as tape drive 110, to transition to an extended power savings mode in which a host interface is kept powered up or left active enough to respond to communication from host system 160 and to respond to communication from library controller 140. In one embodiment, power savings mode authorizer 344 authorizes tape drive 110 to implement an extended power savings mode by sending an authorization signal, such as to power savings mode coordinator 215. In one embodiment, power savings mode authorizer 344 authorizes tape drive 110 to implement an extended power savings mode by setting or resetting a logical switch, such as a bit switch, associated with or accessed by power savings mode coordinator 215. In one embodiment, power savings mode authorizer 344 authorizes tape drive 110 to implement an extended power savings mode in response to tape drive 110 being idle for a pre-determined period of time, such as one minute, and when no media moves are pending for tape drive 110. In one embodiment, power savings mode authorizer 344 authorizes one or more tape drives 110 to implement an extended power savings mode according to a schedule such as when automated storage system 100 is typically lightly used.

Active power instructor 346, when included, instructs a tape drive, such as tape drive 110, to transition from an extended power savings mode to an active power mode. In one embodiment, active power instructor 346 instructs tape drive 110 to return to an active power mode by sending a signal or instruction, such as to power savings mode coordinator 215. In one embodiment, active power instructor 346 instructs tape drive 110 to return to an active power mode by setting or resetting a logical switch, such as a bit switch, associated with or accessed by power savings mode coordinator 215. Active power instructor 346 instructs tape drive 110 to return to an active power mode in response to library controller 140 receiving a media move command involving the tape drive. In one embodiment, the timing of the instruction by active power instructor 346 is such that the transition of tape drive 110 to an active power mode occurs in parallel with an automated move of media performed by media mover (e.g. a move of a tape cartridge 121 to tape drive 110). This can comprise sending the instruction substantially at the same time, slightly before (e.g. several seconds before), or slightly after (e.g. several seconds after) the time at which media move coordinator 342 communicates the media move command to media mover 130.

Active power mode monitor 348, when included, monitors for a tape drive's attainment of an active power mode after the tape drive has been instructed to return to an active power mode. In one embodiment, this comprises active power mode monitor 348 waiting for a signal, such as from active power mode indicator 213, which indicates that tape drive 110 has attained an active power mode and is thus ready to have media mounted and/or to perform read/write operations under direction of host system 160. In one embodiment, this comprises active power mode monitor 348 actively monitoring or querying the state of a logical indicator, such as a bit switch, which is set/reset within or by tape drive 110 (such as by active power mode indicator 213) to indicate that tape drive 110 has attained an active power mode and is thus ready to have media mounted and/or to perform read/write operations under direction of host system 160. In one embodiment, in response to receiving or noting that tape drive 110 has attained an active power mode, active power mode monitor 348 notifies media move coordinator 342 to allow mounting of media that is being moved to tape drive 110. In one embodiment, when media has already been mounted in tape drive 110 and in response to receiving or noting that tape drive 110 has attained an active power mode, active power mode monitor 348 notifies host system 160 that a requested media move has been completed.

Example Tape Drive Power Modes and Power Consumption

Figure 4:
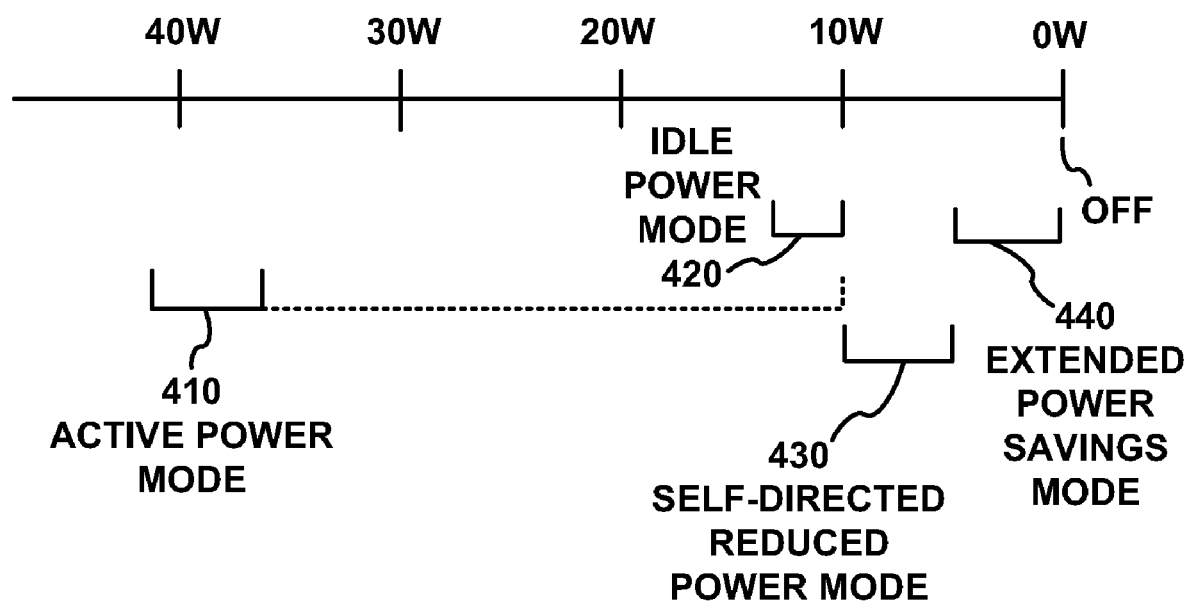
FIG. 4 is diagram of power consumed by an example tape drive, according to an embodiment.

FIG. 4 is diagram 400 of power consumed by an example tape drive 110, according to an embodiment. It is appreciated that this power consumption diagram is provided by way of example, and not of limitation, and that actual values and ranges will vary from tape drive to tape drive. When tape drive 110 is turned "off" it consumes zero watts. When in an active power mode 410 (e.g., with media mounted) tape drive 110 consumes in the range of 37 to 42 watts. When in an idle power mode 420 (e.g., with no media mounted) tape drive 110 is inactive and consumes only 10 to 13 watts. As shown, idle power mode 420 can sometimes be considered to be a subset of active power mode 410. When in a self-directed reduced power mode (such as after being inactive for a pre-specified period of time), tape drive 110 reduces or eliminates power to certain components while still maintaining the ability to attain active power mode 410 very quickly (e.g. in several seconds or less) upon mounting of media. In self-directed reduced power mode 430, tape drive 110 consumes 5 to 10 watts of power. In extended power savings mode 440, power consumed is within a range which is less than 5 watts and slightly greater than zero watts (e.g., 3 watts in one embodiment). In some embodiments, a tape drive may not have a self-directed reduced power mode. As can be seen, extended power savings mode 440 consumes less power than either idle power mode 420 or self-directed reduced power mode 430.

Tape drive 110 only enters extended power savings mode 440 upon receiving an authorization from a source external to tape drive 110. Implicit in this authorization to implement an extended power savings mode within tape drive 110 is a guarantee that tape drive 110 will receive some sort of an instruction to return to an active power mode when a media move to tape drive 110 will be allocated sufficient time to return to an active power mode prior to mounting of media and/or prior to reporting completion of a media move involving mounting media to tape drive 110. This guarantee of a wake up call or time to wake up allows tape drive 110 to take more extreme power savings measures, such as reducing or eliminating power to components which would otherwise be powered (or powered at a higher level) in an idle power mode or in a self-directed reduced power mode. This also allows shutting down some components that will take time to calibrate upon returning to an active power mode. In extended power savings mode 440, host interface 111 remains powered to a level that allows at least minimal communication with and response to host system 160 to maintain the 'presence' of tape drive 110 when polled or communicated with by host system 160. In one embodiment, in extended power savings mode 440, host interface 111 or some other portion of tape drive 110 also maintains at least minimal communication with library controller 140 so that tape drive 110 can receive and act upon an instruction to return to active power mode 410. Aside from such maintaining such minimal communication functions, in one embodiment, other functions and components of tape drive 110 are powered off or are reduced in power to the maximum extent possible. In one embodiment, because of the more extreme power reductions/eliminations in extended power savings mode 440, such as completely removing power to motors 230 and some other electronics, less heat is produced. Because less heat is produced, a fan 220, which is used for cooling, can be turned off or run at a slower speed to conserve even more power. This may also allow additional cooling fans of automated storage system 100 to be powered down or run at lower speed.

Implementing Power Savings in an Automated Storage System

FIG. 5 is a flow diagram 500 illustrating example procedures of a method of implementing power savings in an automated storage system, according to an embodiment. Flow diagram 500 includes processes that, in various embodiments, are carried out by a processor under the control of computer-readable and computer-executable instructions. In one embodiment, this comprises a processor/microcontroller that is in, or used to implement one or more functions of tape library 105. The computer-readable and computer-executable instructions for executing the method illustrated by flow diagram 500 reside, for example, in any tangible computer-readable storage media. Some examples of suitable computer readable storage media include, but are not limited to, a compact disk read only memory (CD-ROM), a read only memory, random access memory, and a magnetic storage media (e.g., a disk or a tape). In some embodiments the computer readable storage media is, or includes, data storage features internal or external to tape drive 110, tape library 105, and/or automated storage system 100. For example, in one embodiment the computer-readable and computer-executable instructions reside on computer-readable storage media such as a ROM or firmware of a processor/microcontroller that is used to perform the functions of, or operates in conjunction with, library controller 140 of FIGS. 1 and 3.

Although a specific flow of procedures is disclosed in flow diagram 500, such a flow is provided for example. That is, embodiments are well suited to performing various other procedures or variations of the procedures recited in flow diagram 500. It is appreciated that, in some embodiments, the procedures in flow diagram 500 may be performed in an order different than presented, and that not all of the procedures in flow diagram 500 may be performed in every embodiment.

At 510 of flow diagram 500, in one embodiment, the method sends a power savings mode authorization from a library controller to a tape drive. The tape drive may be inactive at the time that the authorization is sent, however, the authorization can be sent at any time (i.e., the drive could be active, but authorized to enter the mode when it is next inactive). This power savings mode authorization authorizes the tape drive to enter an extended power savings mode, which maintains an operational host interface in the tape drive for communicating with a host system. In one embodiment, this comprises library controller 140, or more particularly power savings mode authorizer 344, sending a power savings mode authorization to tape drive 110 (or any tape drive of tape drives 110-110n), which is located in automated storage system 100. This authorizes tape drive 110 to enter an extended power savings mode (see e.g., 440 of FIG. 4). As previously described, in some embodiments automated storage system 100 may consist solely of a tape library, such as tape library 105. However, in other embodiments, a tape library, such as tape library 105 is but one piece of the storage solution of automated storage system 100. In various embodiments, the inactivity needed or anticipated prior to sending a power savings mode authorization can be a based upon the tape drive being unused for a pre-defined period, based upon the tape drive anticipated to be inactive following a present period of activity, can be based on a schedule, projection, or historical pattern of use, or can be based on a combination of these or other factors that lead to library controller 140 or some other portion of tape library 105 considering that a particular tape drive is inactive or will become inactive.

At 520 of flow diagram 500, in one embodiment, the method receives a media move command at a tape library of the automated storage system. The media move command comprises a command from the host system. The media move command commands the tape library to move a tape cartridge to the tape drive. In one embodiment, this comprises tape library 105 receiving a media move command. For example, this can comprise library controller 140 receiving a media move command from host system 160. It is appreciated that this command may be tunneled through a tape drive prior to receipt by library controller 140. In an embodiment where the media move command is tunneled through or otherwise passes through a tape drive prior to being routed to and received by library controller 140 or some other portion of tape library 105 it is appreciated that the tape drive (e.g., tape drive 110) may use a monitor, such as monitor 217, to monitor for and receive the media move command if it involves the tape drive. In one embodiment, where monitor 217 is included in tape drive 110 (such as in or coupled with host interface 111), host interface 111 receives the media move command when it is tunneled or routed through tape drive 110.

At 530 of flow diagram 500, in one embodiment, the method issues an instruction to the tape drive to transition from the extended power savings mode to an active power mode. This transition instruction is issued prior to the tape library notifying the host system (which sent the media move command) of completion of the media move command. In one embodiment, the transition instruction is issued to the tape drive in response to the tape library receiving (from host system 160) a media move command that involves the tape drive. In one embodiment, where a media move command involving tape drive 110 is received at library controller 140, this comprises library controller 140 issuing the transition instruction to tape drive 110. In one embodiment, active power instructor 346 issues this transition instruction from library controller 140. In one embodiment, where a media move command involving tape drive 110 is received at tape drive 110, this comprises tape drive 110 self-issuing the transition instruction. In one embodiment, for example, power state mode coordinator 215 or some other portion of host interface 111 issues this transition instruction from within tape drive 110. In one embodiment, where a transition instruction has not been received from library controller 140 or from within tape drive 110 and tape drive 110 detects mounting or insertion of media (e.g. tape cartridge 121) by a media mover, the act of insertion triggers issuing of the transition instruction to power up to an active power mode. For example, a signal received from a media detection sensor or other mechanism can cause host interface 111 or some other portion of tape drive 110 to automatically issue a transition instruction to power tape drive 110 up to an active power mode if tape drive 110 is not already in an active power mode.

At 540 of flow diagram 500, in one embodiment, the method transitions the tape drive to an active power mode in parallel with the moving of the tape cartridge to the tape drive. In various embodiments, this comprises library controller 140 sending the instruction for tape drive 110 to return to an active power mode slightly before, contemporaneously with, or slightly after sending the media move command to media mover 130. In one embodiment, when tape drive 110 monitors for and finds a media move command it self-initiates the power up to an active power mode in a similar manner (e.g., slightly before, during, or after the time that media mover 130 receives the command to move media to tape drive 110). This parallel power up/media move allows tape drive 110 to power up to its active power mode while the physical move of media is taking place. If the power up to the active power mode completes prior to the media move completing, no time is added to responding to host system 160 due to powering up tape drive 110. If the power up to the active power mode does not complete prior to the completion of the media move, at least some portion of the time spent powering up is spent in parallel with the media move, thus lessening any delay due to the powering up of tape drive 110.

In some embodiments, if the power up is not completed before completion of the media move, library controller 140 instructs media mover 130 to delay mounting of the media until the power up is completed and/or library controller 140 delays the reporting of completion of media move command to host system 160 until tape drive 110 is powered up into an active power mode. In one embodiment, the delayed media mounting involves library controller 140 verifying that tape drive 110 has returned to its active power mode prior to library controller 140 authorizing media mover 130 to insert the tape cartridge that is being moved into tape drive 110. In one embodiment, this involves active power mode monitor 348 verifying that tape drive 110 is in its active power mode and then signaling as such to media move coordinator 342, which will then permit media mover 130 to insert a tape cartridge into tape drive 110.

Implementing Power Savings in a Tape Drive of an Automated Storage System

FIG. 6 is a flow diagram 600 illustrating example procedures of a method of implementing power savings in tape drive of an automated storage system, according to an embodiment. Flow diagram 600 includes processes that, in various embodiments, are carried out by a processor under the control of computer-readable and computer-executable instructions. In one embodiment, this comprises a processor/microcontroller that is in, or used to implement one or more functions within, tape drive 110. The computer-readable and computer-executable instructions for executing the method illustrated by flow diagram 600 reside, for example, in any tangible computer-readable storage media. Some examples of suitable computer readable storage media include, but are not limited to, a compact disk read only memory (CD-ROM), a read only memory, random access memory, and a magnetic storage media (e.g., a disk or a tape). In some embodiments the computer readable storage media is, or includes, data storage features internal or external to tape drive 110, tape library 105, and/or automated storage system 100. For example, in one embodiment the computer-readable and computer-executable instructions, reside on computer-readable storage media such as a ROM or firmware of a processor/microcontroller that is used to perform the functions of, or operates in conjunction with, host interface 111 of FIGS. 1 and 2.

Although a specific flow of procedures is disclosed in flow diagram 600, such a flow is provided for example. That is, embodiments are well suited to performing various other procedures or variations of the procedures recited in flow diagram 600. It is appreciated that, in some embodiments, the procedures in flow diagram 600 may be performed in an order different than presented, and that not all of the procedures in flow diagram 600 may be performed in every embodiment.

At 610 of flow diagram 600, in one embodiment, a tape drive of an automated storage system receives a power savings mode authorization from a library controller of the automated storage system. In one embodiment, this comprises, tape drive 110 receiving an authorization to enter an extended power savings mode from library controller 140. In one embodiment, this involves host interface and/or power savings mode coordinator 215 of tape drive 110 receiving the power savings mode authorization from power savings mode authorizer 344 of library controller 140.

At 620 of flow diagram 600, in one embodiment, in response to receiving the power savings mode authorization, the tape drive implements an extended power savings mode within the tape drive. In one embodiment, this comprises power savings mode coordinator 215 implementing, triggering, and/or coordinating the powering off and/or reduction of power of various components such as one or more motors, fans, and/or circuits, such that tape drive 110 is placed into its extended power savings mode (see e.g., 440 of FIG. 4). It is appreciated, however, that in this extended power savings mode host interface 111 remains powered to the extent needed for it to receive and respond to communications from host system 160 such that it maintains its presence/availability to host system 160. In one embodiment in this extended power savings mode, host interface 111 also remains powered to the extent needed for it to receive and respond to/act upon communications from library controller 140, including an instruction from library controller 140 for tape drive 110 to return to an active power mode. As has been previously described herein, when tape drive 110 enters an extended power savings mode it reduces its power consumption level to a level below that of an idle power mode (see e.g., 420 of FIG. 4) and also below that of a self-directed reduced power mode (see e.g., mode 430 of FIG. 4) when a self-directed reduced power mode also exists in the tape drive. This is made possible because it is implicit in the authorization to enter the power savings mode that a wakeup call or instruction will be provided when a media move command directs media to be moved to tape drive 110 and/or that tape library 105 will delay reporting completion of a media move until tape drive 110 has powered up to an active power mode such that it can respond to read/write instructions from host system 160.

At 630 of flow diagram 600, in one embodiment, the tape drive transitions from the extended power savings mode to an active power mode in parallel with an automated physical move of a tape cartridge to the tape drive. In one embodiment, this comprises tape drive 110 powering up from an extended power savings mode to a power mode, such as an active power mode 410, in which tape drive 110 is ready to receive mounting of media and/or to begin responding to read/write instructions received from host system 160.

In one embodiment, this transition comprises tape drive 110 receiving an instruction from library controller 140 (e.g., from active power instructor 346) to transition to an active power mode, and in response to this instruction, initiating the transition to the active power mode. In one such embodiment, library controller 140 coordinates the initiation of the media move such that media mover 130 physically moves the media in parallel with tape drive 110 powering up to its active power mode.

In one embodiment, this transition comprises tape drive 110 receiving information indicative of a host system directing a media move involving the tape drive (e.g., monitor 217 monitoring for and intercepting a media move command involving tape drive 110). In response to receiving this information, tape drive 110 initiates its transition to an active power mode. If the media move command is intercepted as it is being tunneled through tape drive 110, and the power up is initiated quickly (e.g., with in one or two minutes), the power up will likely occur all or in part in parallel with a media move that results from the intercepted media move command.

In one embodiment, when tape drive 110 attains its active power mode, tape drive 110 indicates that it is ready to receive insertion of a tape cartridge. In one embodiment, active power mode indicator 213 indicates this readiness to receive insertion of a cartridge by indicating attainment of, or the state of being in, the active power mode. As previously discussed, this can comprise active power mode indicator 213 setting/resetting of a logical switch, such as within a memory or register of tape drive 110, which is monitored, such as by active power mode monitor 348 of library controller 140. In one embodiment, this comprises active power mode indicator 213 sending a message or signal, such as to active power mode monitor 348 of library controller 140.

At 640 of flow diagram 600, in one embodiment, in response to a media mount (e.g. insertion of a tape cartridge), tape drive 110 automatically initiates a transition to an active power mode if an instruction for such transition has not previously been received. In such an embodiment, when tape drive 110 detects mounting or insertion of media (e.g. tape cartridge 121) by a media mover, the act of insertion triggers issuing of a transition instruction to power up to an active power mode. For example, a signal received from a media detection sensor or other mechanism can cause host interface 111, power savings mode coordinator 215, or some other portion of tape drive 110 to automatically issue an instruction to power tape drive 110 up to an active power mode if tape drive 110 is not already in that mode. In one such embodiment, active power mode indicator 213 does not indicate an active power mode until tape drive 110 has fully powered up and is ready to respond to read/write instructions from host system 160. By monitoring for indication of reaching this active power mode, tape library 105 (e.g., active power mode monitor 348) can delay reporting of completion of a media move command involving tape drive 110 until this indication is present/received.

Example embodiments of the subject matter are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of implementing power savings in an automated storage system comprising:
   sending a power savings mode authorization from a library controller to a tape drive such that said tape drive is authorized to enter an extended power savings mode that maintains an operational host interface in said tape drive for communicating with a host system;
   receiving a media move command at a tape library of said automated storage system, wherein said media move command comprises a command from said host system for said tape library to move a tape cartridge to said tape drive; and
   responsive to receiving said media move command, issuing an instruction to said tape drive to transition from said extended power savings mode to an active power mode, wherein said instruction is issued prior to notifying said host system of completion of said media move command.

2. The method as recited in claim 1, further comprising:
   transitioning said tape drive to an active power mode in parallel with said moving said tape cartridge to said tape drive.

3. The method as recited in claim 1, further comprising:
   verifying at said library controller that said tape drive has returned to said active power mode prior to said library controller authorizing a media mover to insert said tape cartridge into said tape drive.

4. The method as recited in claim 1, wherein said receiving a media move command at a tape library of said automated storage system comprises:
   receiving said media move command at said library controller.

5. The method as recited in claim 4, wherein said issuing an instruction to said tape drive to transition from extended power savings mode to an active power mode comprises:
   issuing said instruction from said library controller.

6. The method as recited in claim 1, wherein said receiving a media move command at a tape library of said automated storage system comprises:
   receiving said media move command at said host interface of said tape drive.

7. The method as recited in claim 6, wherein said issuing an instruction to said tape drive to transition from said extended power savings mode to an active power mode comprises:
   issuing said instruction from within said tape drive.

8. The method as recited in claim 1, wherein said issuing an instruction to said tape drive to transition from said extended power savings mode to an active power mode comprises:
   issuing said instruction by inserting said tape cartridge into said tape drive with a media mover of said tape library.

9. A method of implementing power savings in a tape drive of an automated storage system, said method comprising:
   receiving at said tape drive a power savings mode authorization from a library controller of said automated storage system;
   responsive to receiving said authorization, implementing an extended power savings mode within said tape drive; and transitioning said tape drive from the extended power savings mode to an active power mode in parallel with an automated physical move of a tape cartridge to said tape drive.

10. The method as recited in claim 9, wherein said transitioning said tape drive from the extended power savings mode to an active power mode in parallel with an automated physical move of a tape cartridge to said tape drive comprises:

receiving at said tape drive an instruction from said library controller to transition said tape drive to an active power mode; and responsive to said instruction, initiating said transitioning.

11. The method as recited in claim 9, wherein said transitioning said tape drive from the extended power savings mode to an active power mode in parallel with an automated physical move of a tape cartridge to said tape drive comprises:

receiving at said tape drive information indicative of a host system directing a media move involving said tape drive; and responsive to said information, initiating said transitioning.

12. The method as recited in claim 9, further comprising:
attaining said active power mode in said tape drive; and
indicating readiness of said tape drive to receive insertion of said tape cartridge.

13. The method as recited in claim 12, wherein said indicating readiness of said tape drive to receive insertion of said tape cartridge comprises:

sending a signal to said library controller to indicate said readiness.

14. The method as recited in claim 9, further comprising:
automatically transitioning said tape drive from the extended power savings mode to an active power mode in response to an insertion of a tape cartridge into said tape drive.

15. The method as recited in claim 9, wherein said implementing an extended power savings mode within said tape drive comprises:

keeping a host interface of said tape drive powered on while reducing an overall power consumption level of said tape drive to a level below that of a self-directed reduced power mode of said tape drive.

16. An automated storage system comprising:
a tape drive comprising an extended power savings mode in which a host interface remains active;
a media mover for moving a tape cartridge to said tape drive from one of a plurality of storage slots;
a library controller configured for communicating with said media mover and said tape drive, said library controller comprising:
a power savings mode authorizer for authorizing said tape drive to transition to said extended power savings mode; and
an active power instructor configured for instructing said tape drive to transition to an active power mode in response to said library controller receiving a media move command involving a media move to said tape drive, such that transitioning to said active power mode occurs in parallel with said media mover performing said media move.

17. The automated storage system of claim 16, wherein said library controller further comprises:
an active power mode monitor for monitoring for attainment of an active power mode by said tape drive.

18. The automated storage system of claim 16, wherein said tape drive further comprises:
a power savings mode coordinator configured for coordinating a transition of said tape drive to said extended power savings mode.

19. The automated storage system of claim 16, wherein said tape drive further comprises:
an active power mode indicator configured for indicating attainment of an active power mode by said tape drive.

\* \* \* \* \*